United States Patent
Rahmes et al.

(10) Patent No.: US 11,792,839 B2
(45) Date of Patent: Oct. 17, 2023

(54) SYSTEMS AND METHODS FOR CONTROLLING COMMUNICATIONS BASED ON MACHINE LEARNED INFORMATION

(71) Applicant: Eagle Technology, LLC, Melbourne, FL (US)

(72) Inventors: Mark D. Rahmes, Melbourne, FL (US); Thomas J. Billhartz, Melbourne, FL (US); David B. Chester, Palm Bay, FL (US); Chad Chung Lau, Melbourne, FL (US); Vladislav M. Fomitchev, Naples, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 474 days.

(21) Appl. No.: 17/200,257

(22) Filed: Mar. 12, 2021

(65) Prior Publication Data
US 2022/0295495 A1    Sep. 15, 2022

(51) Int. Cl.
G06N 20/00    (2019.01)
H04W 72/563   (2023.01)
G06N 5/04     (2023.01)

(52) U.S. Cl.
CPC .......... H04W 72/563 (2023.01); G06N 5/042 (2013.01); G06N 20/00 (2019.01)

(58) Field of Classification Search
CPC ............................ H04W 16/14; H04B 1/715
USPC .................................................. 370/329, 252
See application file for complete search history.

(56) References Cited

U.S. PATENT DOCUMENTS

| | | |
|---|---|---|
| 6,518,018 B1 | 2/2003 | Szostak et al. |
| 7,069,282 B2 | 6/2006 | Rizzotto et al. |
| 7,203,715 B2 | 4/2007 | Rizzotto et al. |
| 7,334,008 B2 | 2/2008 | Branciforte et al. |
| 7,359,928 B2 | 4/2008 | Porto et al. |
| 7,400,282 B2 | 7/2008 | Tanaka et al. |
| 8,077,988 B2 | 12/2011 | Donoho |
| 8,583,903 B2 | 11/2013 | Freedman et al. |
| 9,047,571 B2 | 6/2015 | Miller et al. |
| 10,176,433 B2 | 1/2019 | Hastings et al. |

(Continued)

OTHER PUBLICATIONS

Roch C, Phan T, Feld S, et al. A Quantum Annealing Algorithm for Finding Pure Nash Equilibria in Graphical Games. Computational Science—ICCS 2020. 2020;12142:488-501. Published May 25, 2020.

(Continued)

*Primary Examiner* — Kiet M Doan
(74) *Attorney, Agent, or Firm* — Fox Rothschild LLP; Carol Thorstad-Forsyth

(57) ABSTRACT

Systems and methods for operating a communication device. The methods comprise: receiving a signal at the communication device; performing, by the communication device, one or more machine learning algorithms using at least one feature of the signal as an input to generate a plurality of scores (each score representing a likelihood that the signal was modulated using a given modulation type of a plurality of different modulation types); assigning a modulation class to the signal based on the plurality of scores; determining whether a given wireless channel is available based at least on the modulation class assigned to the signal; and selectively using the given wireless channel for communicating signals based on results of the determining.

17 Claims, 11 Drawing Sheets

| Machine Learning Algorithm | Modulation Class | Confidence Score |
|---|---|---|
| $A_1$ | $M_1$ | $S_{1-1}$ |
| $A_1$ | $M_2$ | $S_{1-2}$ |
| ⋮ | ⋮ | ⋮ |
| $A_1$ | $M_{24}$ | $S_{1-24}$ |
| $A_2$ | $M_1$ | $S_{2-1}$ |
| $A_2$ | $M_2$ | $S_{2-2}$ |
| ⋮ | ⋮ | ⋮ |
| $A_2$ | $M_{24}$ | $S_{2-24}$ |
| ⋮ | ⋮ | ⋮ |
| $A_N$ | $M_1$ | $S_{N-1}$ |
| $A_N$ | $M_2$ | $S_{N-2}$ |
| ⋮ | ⋮ | ⋮ |
| $A_N$ | $M_{24}$ | $S_{N-24}$ |

500

(56) References Cited

U.S. PATENT DOCUMENTS

| | | | |
|---|---|---|---|
| 10,423,887 | B2 | 9/2019 | Roetteler et al. |
| 10,505,524 | B1 | 12/2019 | Cohen et al. |
| 10,592,216 | B1 | 3/2020 | Richardson et al. |
| 10,664,761 | B2 | 5/2020 | Haener et al. |
| 10,666,238 | B1 | 5/2020 | Cohen et al. |
| 10,713,582 | B2 | 7/2020 | Dadashikelayeh |
| 2003/0149511 | A1 | 8/2003 | Rizzotto et al. |
| 2004/0059765 | A1 | 3/2004 | Rizzotto et al. |
| 2004/0130956 | A1 | 7/2004 | Porto et al. |
| 2004/0162640 | A1 | 8/2004 | Branciforte et al. |
| 2004/0179622 | A1 | 9/2004 | Calabro et al. |
| 2006/0224547 | A1 | 10/2006 | Ulyanov et al. |
| 2007/0120727 | A1 | 5/2007 | Tanaka et al. |
| 2008/0140746 | A1 | 6/2008 | Papageorgiou et al. |
| 2008/0140749 | A1 | 6/2008 | Amato et al. |
| 2011/0161638 | A1 | 6/2011 | Freedman et al. |
| 2014/0192388 | A1 | 7/2014 | Miller et al. |
| 2016/0202195 | A1 | 7/2016 | Wittwer et al. |
| 2017/0147695 | A1 | 5/2017 | Shih |
| 2017/0330101 | A1 | 11/2017 | Hastings et al. |
| 2018/0038973 | A1 | 2/2018 | Ascough et al. |
| 2018/0038975 | A1 | 2/2018 | Rahmes et al. |
| 2018/0144262 | A1 | 5/2018 | Roetteler et al. |
| 2018/0293242 | A1* | 10/2018 | Shishkin ............ G06F 16/24578 |
| 2019/0340532 | A1 | 11/2019 | Ducore et al. |
| 2019/0361675 | A1 | 11/2019 | Haener et al. |
| 2019/0362270 | A1 | 11/2019 | Haener et al. |
| 2020/0097859 | A1 | 3/2020 | Hu et al. |
| 2020/0125402 | A1 | 4/2020 | Griffin et al. |
| 2020/0134107 | A1 | 4/2020 | Low et al. |
| 2020/0169317 | A1 | 5/2020 | Rahmes et al. |
| 2020/0169458 | A1 | 5/2020 | Rahmes et al. |
| 2020/0198138 | A1 | 6/2020 | Nagayama et al. |
| 2020/0202247 | A1 | 6/2020 | Hu et al. |
| 2020/0202249 | A1 | 6/2020 | Hastings |
| 2020/0211021 | A1* | 7/2020 | Allbright ............... G06N 20/00 |
| 2020/0218518 | A1 | 7/2020 | Gambetta et al. |
| 2023/0045078 | A1* | 2/2023 | Berisha ................ A61B 5/4803 |

OTHER PUBLICATIONS

Piotrowski, Edward & Sladkowski, Jan. (2003). The next stage: quantum game theory.

Chiu Fan Lee and Neil F. Johnson (2002) "Let the Quantum Games Begin" Centre for Quantum Computation, Clarendon Laboratory, Oxford University Oct. 2, 2002.

E Farhi, J Goldstone, S Gutmann, A quantum approximate optimization algorithm (QAOA), arXiv preprint arXiv:1411.4028, 2014—arxiv.org.

Rahmes, Billhartz, Chester, Lau (2020) "Optimal Deep Learning Signal Classification with Wavelet Compressive Sensing" Interservice/Industry Training, Simulation, and Education Conference (I/ITSEC), Aug. 24, 2020.

Rahmes, Billhartz, Cocks (2020) "A Quantum Computing Algorithm for Subset Summing Optimization" Interservice/Industry Training, Simulation, and Education Conference (I/ITSEC), Sep. 24, 2020.

https://www.cei.se/quantum-computing-and-qc-assisted-communications.

M. Rahmes, R. Clouse, J. Virts, G. Yakimovicz, B. Rees and W. Talbert, "Cognitive mission planning and system orchestration," 2017 International Conference on Computing, Networking and Communications (ICNC), 2017, pp. 745-749.

Daniel Evans (2018) "Dissecting a Quantum Program", Seidenberg School of CSIS, Pace University, Pleasantville, New York, Proceedings of Student-Faculty Research Day, CSIS, Pace University, May 4, 2018.

Abualsaud, K., Mahmuddin, M., Hussein, R., & Mohamed, A. (Jul. 2013). Performance evaluation for compression-accuracy trade-off using compressive sensing for EEG-based epileptic seizure detection in wireless tele-monitoring. In 2013 9th International Wireless Communications and Mobile Computing Conference (IWCMC) (pp. 231-236). IEEE.

Baraniuk, R. G., Goldstein, T., Sankaranarayanan, A. C., Studer, C., Veeraraghavan, A., & Wakin, M. B. (2017). Compressive video sensing: algorithms, architectures, and applications. IEEE Signal Processing Magazine, 34(1), 52-66.

Hanif, M. S., & Bilal, M. (2019). Competitive residual neural network for image classification. ICT Express.

He, K., Zhang, X., Ren, S., & Sun, J. (2016). Deep residual learning for image recognition. In Proceedings of the IEEE conference on computer vision and pattern recognition (pp. 770-778).

Kingma, D. P., & Ba, J. (2014). Adam: A method for stochastic optimization. arXiv preprint arXiv:1412.6980.

Krizhevsky, A., Sutskever, I., & Hinton, G. E. (2012). Imagenet classification with deep convolutional neural networks. In Advances in neural information processing systems (pp. 1097-1105).

Nawaz, T., Marcenaro, L., & Regazzoni, C. S. (2017). Cyclostationary-based jammer detection for wideband radios using compressed sensing and artificial neural network. International Journal of Distributed Sensor Networks, 13(12), 1550147717748900.

Oquab, M., Bottou, L., Laptev, I., & Sivic, J. (2014). Learning and transferring mid-level image representations using convolutional neural networks. In Proceedings of the IEEE conference on computer vision and pattern recognition (pp. 1717-1724).

O'Shea, T. J., Roy, T., & Clancy, T. C. (2018). Over-the-air deep learning-based radio signal classification. IEEE Journal of Selected Topics in Signal Processing, 12(1), 168-179.

Pandian, R., Vigneswara, T., & Kumari, S. L. (2016). Effects of Decomposition Levels of Wavelets in Image Compression Algorithms. Journal of Biomedical Sciences, 5(4), 29.

Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.

Rajendran, S., Meert, W., Giustiniano, D., Lenders, V., & Pollin, S. (2018). Deep learning models for wireless signal classification with distributed low-cost spectrum sensors. IEEE Transactions on Cognitive Communications and Networking, 4(3), 433-445.

Ramjee, S., Ju, S., Yang, D., Liu, X., Gamal, A. E., & Eldar, Y. C. (2019). Fast deep learning for automatic modulation classification. arXiv preprint arXiv:1901.05850.

Schilling, A., Matzner, C., Rietsch, J., Gerum, R., Schulze, H., & Krauss, P. (2018). How deep is deep enough?—Quantifying class separability in the hidden layers of deep neural networks. arXiv preprint arXiv:1811.01753.

Sejdi?, E., Orovi?, I., & Stankovi?, S. (2018). Compressive sensing meets time-frequency: an overview of recent advances in time-frequency processing of sparse signals. Digital signal processing, 77, 22-35.

Sharma, D. K., Mishra, A., & Saxena, R. (2010). Analog & Digital Modulation Techniques: An overview. International Journal of Computing Science and Communication Technologies, 3(1), 2007.

Sharma, S. K., Lagunas, E., Chatzinotas, S., & Ottersten, B. (2016). Application of compressive sensing in cognitive radio communications: A survey. IEEE communications surveys & tutorials, 18(3), 1838-1860.

Simonyan, K., & Zisserman, A. (2014). Very deep convolutional networks for large-scale image recognition. arXiv preprint arXiv:1409. 1556.

Talukder, K. H., & Harada, K. (2010). Haar wavelet-based approach for image compression and quality assessment of compressed image. arXiv preprint arXiv:1010.4084.

Tembine, H. (2019). Deep learning meets game theory: Bregman-based algorithms for interactive deep generative adversarial networks. IEEE transactions on cybernetics.

Wang, S., Sun, Z., Liu, S., Chen, X., & Wang, W. (Oct. 2014). Modulation classification of linear digital signals based on compressive sensing using high-order moments. In 2014 European Modelling Symposium (pp. 145-150). IEEE.

Junyi Liu, Bohua Zhan, Shuling Wang. Shenggang Ying, Tao Liu, Yangjia Li, Mingsheng Ying, Naijun Zhan. International Conference on Computer Aided Verification. Formal Verification of Quantum Algorithms Using Quantum Hoare Logic.

(56) References Cited

OTHER PUBLICATIONS

Zhou, L., & Man, H. (Nov. 2013). Distributed automatic modulation classification based on cyclic feature via compressive sensing. In MILCOM 2013-2013 IEEE Military Communications Conference (pp. 40-45). IEEE.

Ali, S. Coming to a Battlefield Near You: Quantum Computing, Artificial Intelligence, & Machine Learning's Impact on Proportionality.

Berendsen, R. G. (2019). The Weaponization of Quantum Mechanics: Quantum Technology in Future Warfare. US Army School of Advanced Military Studies Fort Leavenworth United States.

Cariolaro, Gianfranco, Quantum Communications, (2015), Springer International Publishing.

Cuccaro, S. A., Draper, T. G., Kutin, S. A., & Moulton, D. P. (2004). A new quantum ripple-carry addition circuit. arXiv preprint quant-ph/0410184.

Farhi, E., & Harrow, A. W. (2016). Quantum supremacy through the quantum approximate optimization algorithm. arXiv preprint arXiv:1602.07674.

Flitney, A. P., & Abbott, D. (2002). An introduction to quantum game theory. Fluctuation and Noise Letters, 2(04), R175-R187.

Hilary, Jack D., (2019) Quantum Computing: An Applied Approach, Springer Nature Switzerland AG.

Iqbal, A., & Toor, A. H. Quantum mechanics gives stability to a Nash equilibrium. Physical Review A Phys Rev A, 65, 022306.

Jordan, J. D. (2007). Updating Optimal Decisions Using Game Theory and Exploring Risk Behavior Through Response Surface Methodology.

Kalogeras, D. (2013). The quantum theory in decision making. Journal of Computations y Modelling, 3(4), 61-81.

Koiliaris, K., & Xu, C. (2019). Faster pseudopolynomial time algorithms for subset sum. ACM Transactions on Algorithms (TALG), 15(3), 1-20.

Liffiton, M. H., & Sakallah, K. A. (2008). Algorithms for computing minimal unsatisfiable subsets of constraints. Journal of Automated Reasoning, 40(1), 1-33.

Moll, N., Barkoutsos, P., Bishop, L. S., Chow, J. M., Cross, A., Egger, D. J., . . . & Kandala, A. (2018). Quantum optimization using variational algorithms on near-term quantum devices. Quantum Science and Technology, 3(3), 030503.

Oliveira, D. S., & Ramos, R. V. (2007). Quantum bit string comparator: circuits and applications. Quantum Comput. Comput, 7(1), 17-26.

Paç, A. B. (2010). Row generation techniques for approximate solution of linear programming problems (Doctoral dissertation, bilkent university).

Preskill, John, Quantum Computing in the NISQ era and beyond, 2018, California Institute of Technology.

Rahmes, M., Wilder, K., Yates, H., & Fox, K. (2013). Near real time discovery and conversion of open source information to a reward matrix. WMSCI 2013, 12.

Ruffinelli, D., & Barán, B. (2017). Linear nearest neighbor optimization in quantum circuits: a multiobjective perspective. Quantum Information Processing, 16(9), 220.

Takahashi, Y., Tani, S., & Kunihiro, N. (2009). Quantum addition circuits and unbounded fan-out. arXiv preprint arXiv:0910.2530.

Ulyanov, S. V., Litvintseva, L. V., Ulyanov, S. S., Takahashi, K., & Panfilov, A. L. (2004). Computational intelligence with quantum game's approach and robust decision-making in communication information uncertainty. In Proceedings of Internat. Conf. on Computational Intelligence (pp. 172-187).

Wayne, L. (2004). Winston (2004). Operations Research, Applications and Algorithms. Duxbury Press.

Wendin, G. (2017). Quantum information processing with superconducting circuits: a review. Reports on Progress in Physics, 80(10), 106001.

Wolff, M., Wirsching, G., Huber, M., Graben, P. B., Römer, R., & Schmitt, I. (2018). A Fock Space Toolbox and Some Applications in Computational Cognition. Unpublished. Retrieved from http://rgdoi.net/10.13140/RG.2.2.10025.70245.

Yukalov, V. I., & Sornette, D. (2009). Processing information in quantum decision theory. Entropy, 11(4), 1073-1120.

Robert Rand, Jennifer Paykin, Steve Zdancewic. 14th International Conference on Quantum Physics and Logic (QPL). 2018. QWIRE Practice: Formal Verification of Quantum Circuits in Coq.

Robert Rand, Kesha Hietala, and Kartik Singhal. POPL 2020. Verified Quantum Computing.

\* cited by examiner

SYSTEMS AND METHODS FOR CONTROLLING COMMUNICATIONS BASED ON MACHINE LEARNED INFORMATION

BACKGROUND

Statement of the Technical Field

The present disclosure relates generally to communication systems. More particularly, the present disclosure relates to implementing systems and methods for controlling communications based on machine learned information.

Description of the Related Art

Wireless communication systems exist today, and are used in various applications. Some of these wireless communication systems comprise cognitive radios. A cognitive radio is a radio that is configured to dynamically use wireless channels to avoid user interference and congestion. During operations, the cognitive radio detects which of the wireless channels is(are) available, and then configures its parameters to facilitate use of the available communication channel(s).

SUMMARY

The present disclosure concerns implementing systems and methods for operating a communication device (e.g., a cognitive radio). The methods comprise: receiving a signal at the communication device; performing, by the communication device, one or more machine learning algorithms using at least one feature of the signal as an input to generate a plurality of scores (each score representing a likelihood that the signal was modulated using a given modulation type of a plurality of different modulation types); assigning a modulation class to the signal based on the plurality of scores; determining whether a given wireless channel is available based at least on the modulation class assigned to the signal; and selectively using the given wireless channel for communicating signals based on results of the determining.

In some scenarios, the signal is assigned the modulation class that is associated with a given score selected from the plurality of scores. The score may be selected as the score with the greatest or highest value. Alternatively, the score is selected based on results from performance of an optimization algorithm (e.g., a game theory analysis of the machine learning algorithms and outputs). The scores can include, but are not limited to, goodness-of-fit-predicted scores.

In those or other scenarios, the methods further involve deciding whether a source of the signal was a primary user of the given wireless channel based on the modulation class assigned to the signal, a bit rate of the signal, and/or a center frequency of the signal. A determination is made that the given wireless channel is unavailable when a decision is made that the primary user is the source of the signal.

The implementing systems comprise a processor, and a non-transitory computer-readable storage medium comprising programming instructions that are configured to cause the processor to implement a method for performing demodulation operations to extract the desired signal from the combined waveform.

BRIEF DESCRIPTION OF THE DRAWINGS

The present solution will be described with reference to the following drawing figures, in which like numerals represent like items throughout the figures.

DETAILED DESCRIPTION

Figure 1:
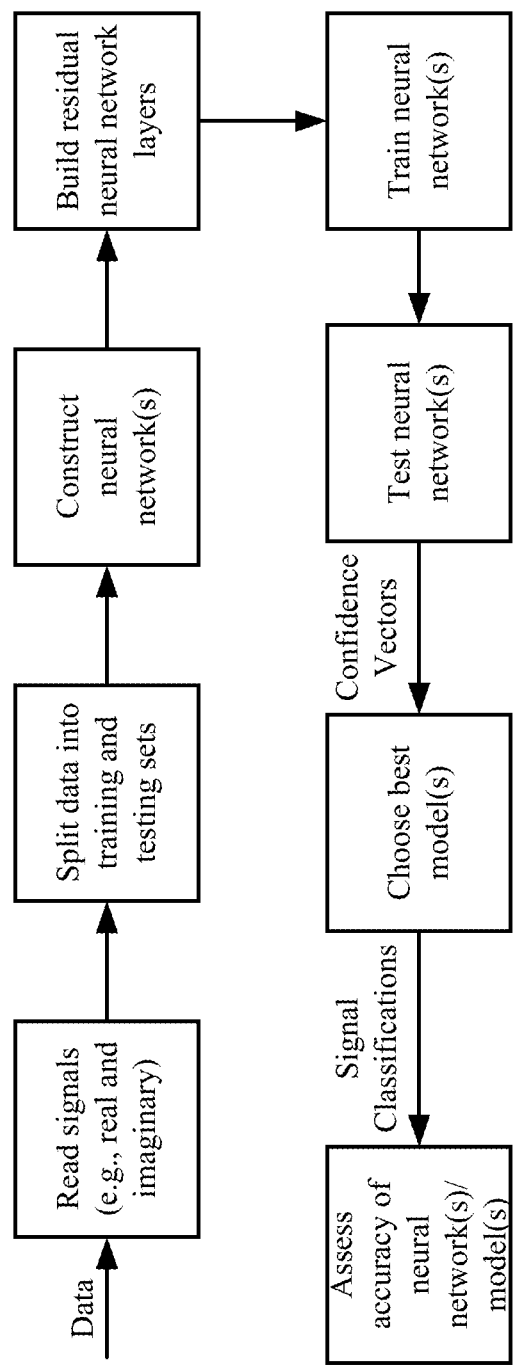
FIG. 1 provides an illustration of an illustrative signal classification system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Signal recognition and classification has been accomplished using feature-based, expert-system-driven (i.e., non-machine-learning) techniques. The feature-based, expert-system-driven techniques are relatively computationally slow and costly to implement. The present solution provides an alternative solution for signal recognition and classification that overcomes the drawbacks of conventional feature-based, expert-system-driven solutions.

The present solution employs a machine-learning based approach which provides a faster, less-expensive path to adding new signals to a list of recognized signals, offers better recognition performance at lower Signal-to-Noise Ratios (SNRs), and recognizes signals and sources thereof faster and with an improved accuracy as compared to that of the conventional feature-based, expert-system-driven solutions. In some scenarios, the machine-learning based approach uses expert systems and/or deep learning to facilitate signal recognition and classification. The deep learning can be implemented by one or more neural networks (e.g., Residual Neural Network(s) (ResNet(s)), and/or Convolutional Neural Network(s) (CNN(s))). The individual neural networks may be comprised of numerous stacked layers of various modalities to provide a plurality of layers of convolution. The neural networks are trained to automatically recognize and determine modulation types of received wireless communication signals from digitally sampled and processed data. This training can be achieved, for example, using a dataset that includes information for signals having SNRs from −20 dB to +30 dB and being modulated in accordance with a plurality of analog and/or digital modulation schemes (e.g., phase shift keying, and/or amplitude shift keying).

The machine-learning based approach of the present solution can be implemented to provide a cognitive, automated system to optimize signal classification analyses by modulation choices from data with various SNRs (e.g., SNRs from −20 dB to +30 dB). Subsystems can include, but are not limited to, a tuner, a digitizer, a classifier, and/or an optimizer. Fast recognition and labeling of Radio Frequency (RF) signals in the vicinity is a needed function for Signal Intelligence (SIGINT) devices, spectrum interference monitoring, dynamic spectrum access, and/or mesh networking.

Artificial intelligence (AI) algorithms and/or game theoretic analysis may be used to help solve the problem of signal classification through supervised classification. The game theory analysis provides a flexible framework to model strategies for improved decision-making optimization. Classification strategies may be based on different supervised gradient descent learning algorithms and/or different neural network structures. Individual trainable networks are the potential decisions of a one-sided, single-player game vs. nature, and the action is to choose the goodness-of-fit weighting of the composite network for optimal decision making. A novel, game-theoretic perspective has been derived for solving the problem of supervised classification that takes the best signal modulation prediction derived from supervised classification models. In this one-player game, the system determines the modulation type by choosing the best network model from a plurality of network models at a given time. Within this formulation, a reward matrix (weighted or non-weighted) is used for consistent classification factors that results in higher accuracy and precision compared to using individual machine learning models alone.

The reward matrix comprises an MxC matrix, where M is the number of machine learned models and C is the number of modulation classes. The reward matrix uses goodness-of-fit-predicted class scores or responses in the form of a matrix based on the number of signals and modulation classes. These goodness-of-fit-predicted class scores are used in a linear program to optimally choose which machine learned model to use per signal. For example, a machine learned model can be selected in accordance with the following mathematical equation:

maximize $f(x)$ subject to $Ax \le b$ $x \ge 0$ where x represents a decision variable, A represents coefficients in a reward matrix, b represents coefficients which satisfy constraints, and f represents a linear objective function of constants.

FIG. 1 presents an overview of the signal classification system. The signal classification system is generally configured to generate machine learned models including sets of signal features/characteristics that can be used to recognize and classify signals and/or sources of signals. These sets of signal features/characteristics are then stored in a datastore(s) and/or used by communication devices (e.g., cognitive radios) to determine, for example, whether wireless channels are available or unavailable.

The communication devices can include, but are not limited to, cognitive radios configured to recognize and classify radio signals by modulation type at various Signal-to-Noise Ratios (SNRs). Each of the cognitive devices comprises a cognitive sensor employing machine learning algorithms. In some scenarios, the machine learned algorithms include neural networks which are trained and tested using an extensive representative dataset consisting of 24 or more digital and analog modulations. The neural networks learn from the time domain amplitude and phase information of the modulation schemes present in the training dataset. The machine learning algorithms facilitate making preliminary estimations of modulation types and/or signal sources based on machine learned signal feature/characteristic sets. Linear programming optimization may be used to determine the best modulation classification based on prediction scores output from one or more machine learning algorithms.

A communication device can significantly reduce the potentially massive memory storage requirements needed for training data by using compressive sensing techniques, such as but not limited to the Discrete Wavelet Transform (DWT). Data compression techniques such as the DWT transform signals into sparse coefficient sets, and many of the coefficients may be discarded without negatively affecting performance of the communication device. Through this discarding of coefficients, the storage requirements become significantly less than what would have been required for the original signal data.

Figure 2:
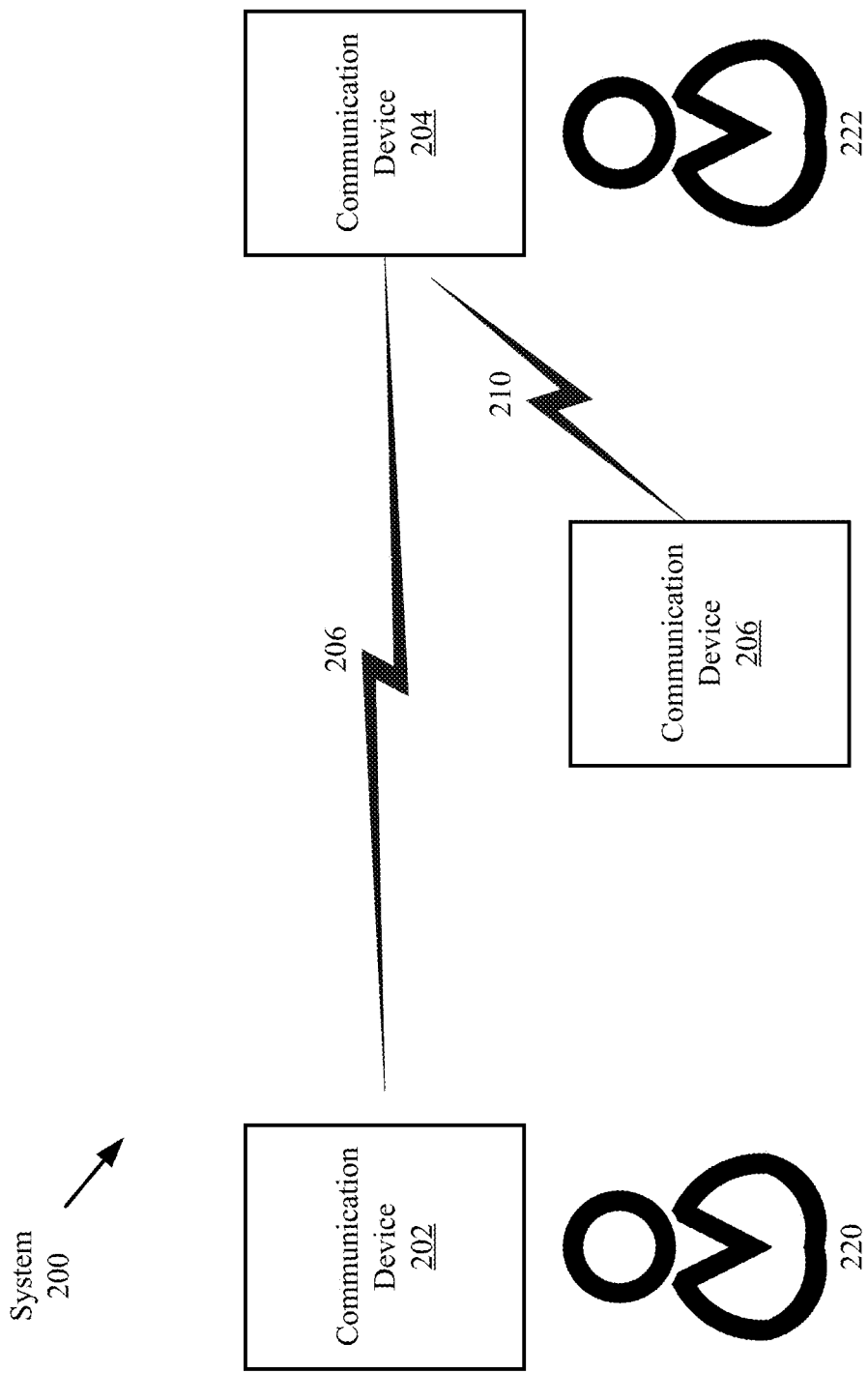
FIG. 2 provides an illustration of an illustrative system configured to perform signal recognition and classification in accordance with the present solution.

Referring now to FIG. 2, there is provided an illustration of an illustrative communications system 200. Communications system 200 is generally configured to allow communications amongst communication devices 202, 204, 208 over wireless channels 206, 210 in a waveform spectrum. The communication devices can include, but are not limited to, cognitive radios. Each cognitive radio is configured to dynamically share the wireless channels 206, 210 to avoid user interference and congestion. The manner in which the communication devices perform dynamic spectrum sharing and/or dynamically transition between wireless channels will be described below in relation to FIG. 3.

A user 220 of communication device 202 is a primary user of wireless channel 206. As such, the user 220 has first rights to communicate information over wireless channel 206 via communication device 202 a given amount of time (e.g., X microseconds, where X is an integer). User 220 licensed use of the wireless channel 206 to another user 222. User 222 constitutes a secondary user. Accordingly, user 222 is able to use the wireless channel 206 to communicate information to/from communication device 204 during the time in which the wireless channel is not being used by the primary user 220 for wireless communications. Detection of the primary user by the secondary user is critical to the cognitive radio environment. The present solution provides a novel solution for making such detections by secondary users in a shorter amount of time as compared to conventional solutions. The novel solution will become evident as the discussion progresses.

During operations, the communication device 204 monitors communications on wireless channel 206 to sense spectrum availability, i.e., determine an availability of the wireless channel. The wireless channel 206 is available when the primary user 220 is not and has not transmitted a signal thereover for a given amount of time. The wireless channel 206 is unavailable when the primary user 220 is transmitting a signal thereover or has transmitted a signal thereover within a given amount of time. When a determination is made that the wireless channel 206 is unavailable, the communication device 204 performs operations to transition to another wireless channel 210. This channel transition may be achieved by changing an operational mode of the communication device 204 and/or by changing channel parameter(s) of the communication device 204. The communication device 204 may transition back to wireless channel 206 when a determination is made that the primary user 220 is no longer using the same for communications.

Figure 3:
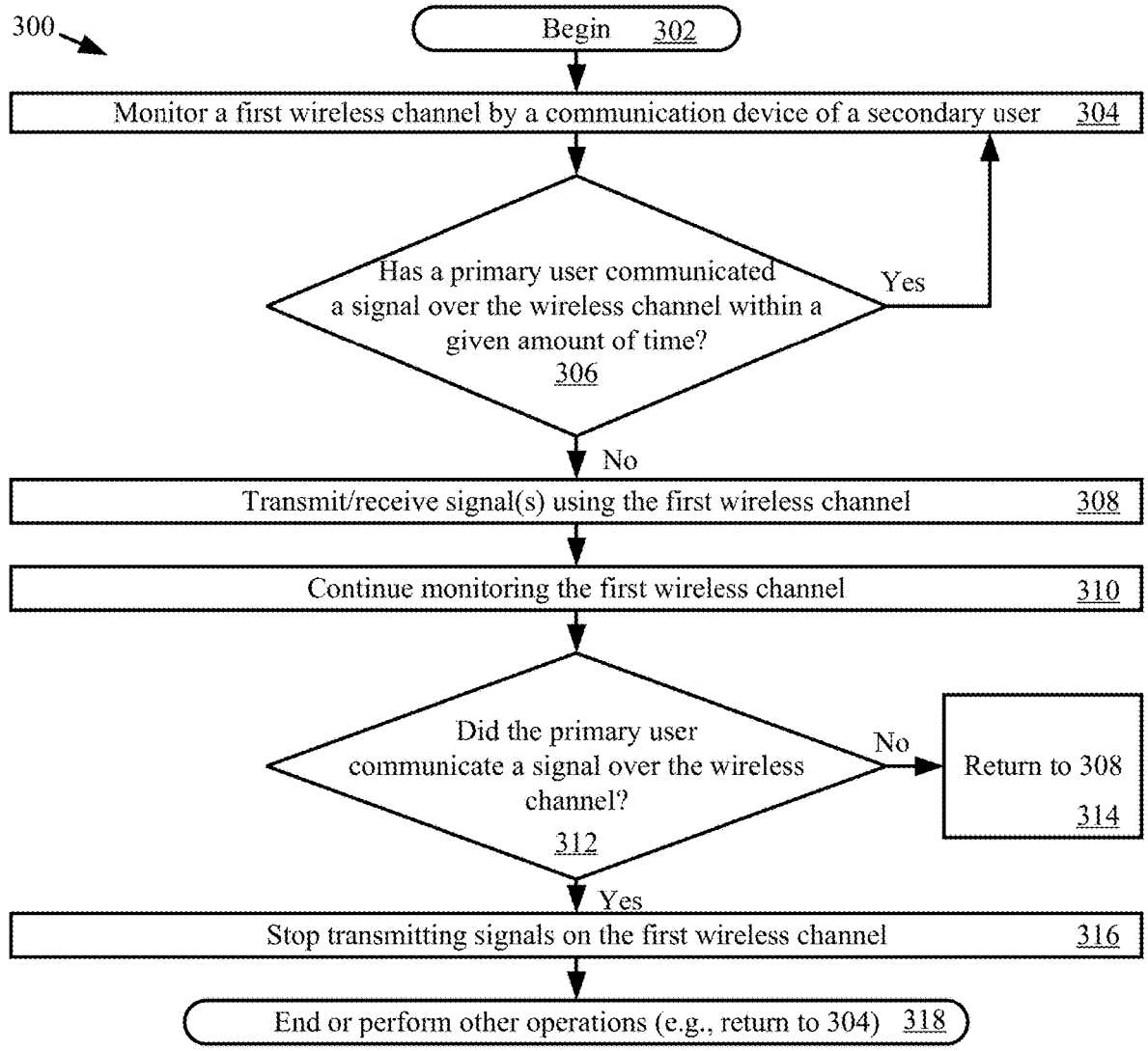
FIG. 3 provides a flow diagram of an illustrative method for operating the system of FIG. 1.

Referring now to FIG. 3, there is provided a flow diagram of an illustrative method 300 for operating a system (e.g., system 200 of FIG. 2). Method 300 begins with 302 and continues with 304 where a communication device (e.g., communication device 202 of FIG. 2) of a secondary user (e.g., user 222 of FIG. 2) monitors at least one first wireless channel (e.g., wireless channel 206 of FIG. 2) for availability. This monitoring involves: receiving signals communicated over the first wireless channel(s); and processing the signals to determine whether a primary user (e.g., user 220 of FIG. 2) is using the first wireless channel(s) for communications. If so [306:YES], then the wireless channel(s) is(are) considered unavailable. Accordingly, the communication device continues monitoring the first wireless channel(s). If not [306:N0], then the wireless channel(s) is(are) considered available. As such, the communication device may use the first wireless channel(s) for communicating signals as shown by 308.

As shown by 310, the communication device continues to monitor the first wireless channel(s). The communication device continues to use the wireless channel(s) for a given period of time or until the primary user once again starts using the same for communications, as shown by 312-314. When the communication device detects that the primary user is once again using the wireless channel(s) [312:YES], then the communication device stops transmitting signals on the first wireless channel(s) as shown by 316. Subsequently, 318 is performed where method 300 ends or other operations are performed (e.g., return to 304).

Figure 4:
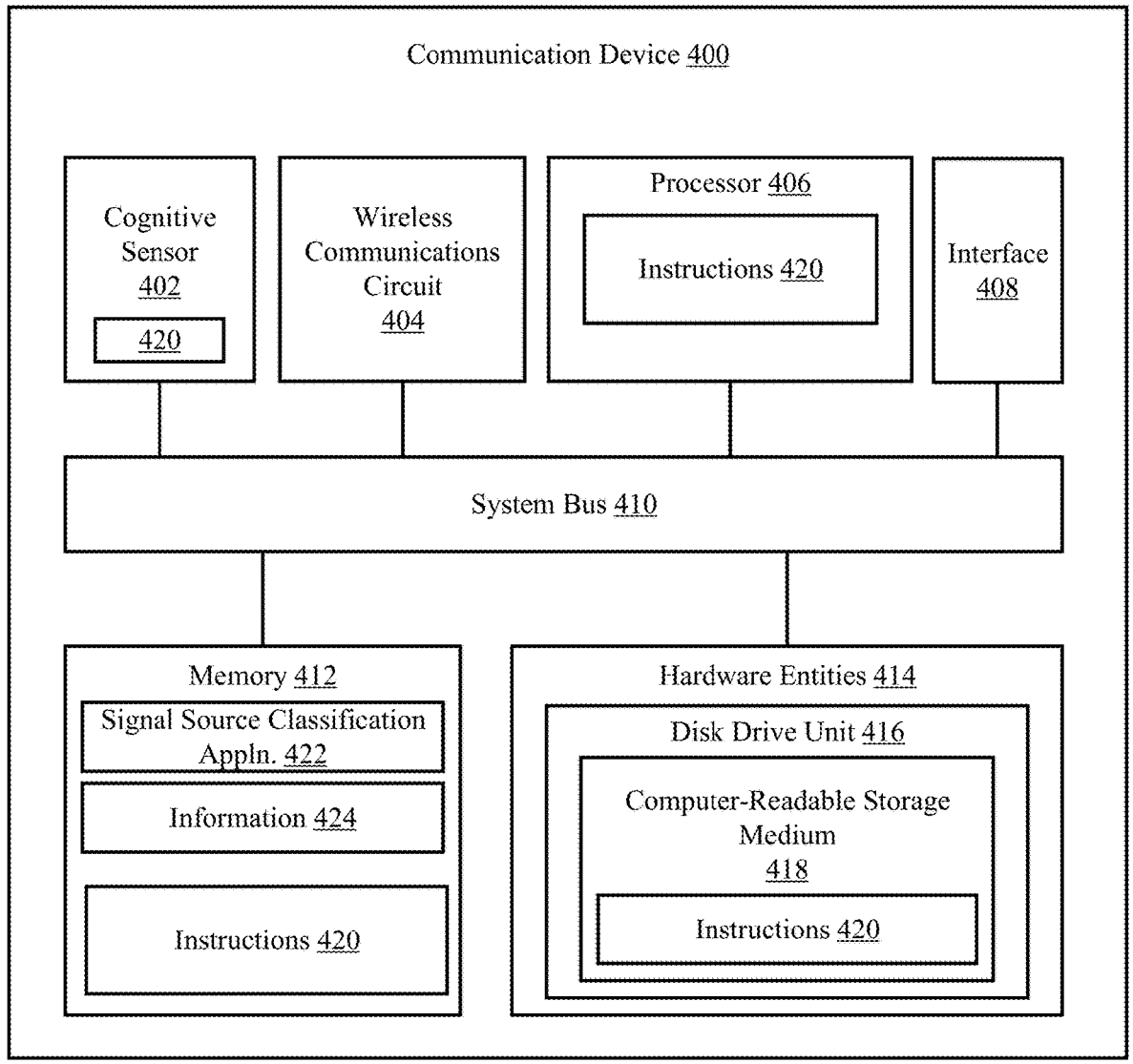
FIG. 4 provides a block diagram of an illustrative communication device.

A detailed block diagram of an illustrative architecture for a communication device is provided in FIG. 4. The communication devices 202, 204 and/or 206 of FIG. 2 may be the same as or substantially similar to communication device 400 of FIG. 4. As such, the discussion of communication device 400 is sufficient for understanding communication devices 202, 204, 206 of FIG. 2.

Communication device 400 implements a machine learning algorithm to facilitate determinations as to an available/unavailable state of wireless channel(s) (e.g., wireless channel 206 of FIG. 2). The communication device 400 dynamically transitions communication operations between wireless channels based on the determined available/unavailable state(s) thereof. In this regard, the communication device 400 includes a plurality of components shown in FIG. 4. The communication device 400 may include more or less components than those shown in FIG. 4. However, the components shown are sufficient to disclose an illustrative solution implementing the present solution. The hardware architecture of FIG. 4 represents one implementation of a representative communication device configured to enable dynamic use of wireless channels to avoid user interference and congestion. As such, the communication device 400 of FIG. 4 implements at least a portion of the method(s) described herein.

The communication device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the communication device 400 comprises a cognitive sensor 402, a wireless communications circuit 404, a processor 406, an interface 408, a system bus 410, a memory 412 connected to and accessible by other portions of communication device 400 through system bus 410, and hardware entities 414 connected to system bus 410. The interface 408 provides a means for electrically connecting the communication device 400 to other external circuits (e.g., a charging dock or device).

The cognitive sensor 402 is generally configured to determine a source of a signal transmitted over a wireless channel. This determination is made via a signal source classification application 422 using information 424. Information 424 comprises outputs generated by one or more machine learning algorithms. The machine learning algorithm(s) can employ supervised machine learning. Supervised machine learning algorithms are well known in the art. In some scenarios, the machine learning algorithm(s)

include(s), but is(are) not limited to, a deep learning algorithm (e.g., a Residual neural network (ResNet), a Convolutional Neural Network (CNN), and/or a Recurrent Neural Network (RNN) (e.g., a Long Short-Term Memory (LSTM) neural network)). The machine learning process implemented by the present solution can be built using Commercial-Off-The-Shelf (COTS) tools and/or a commercially available Field Programmable Gate Array (FPGA) (e.g., Xilinx Vertex 7 FPGA).

Each machine learning algorithm is provided one or more feature inputs for a received signal, and makes a decision as to a modulation classification for the received signal. In some scenarios, the machine learning algorithms include neural networks that produce outputs hi in accordance with the following mathematical equations.

$$h_i = L(w_i(x_i)) \quad (1)$$

$$h_i = L(w_2(x_2) + w_2(x_2) + \ldots + w_i(x_i)) \quad (2)$$

where $L( )$ represents a likelihood ratio function, $w_1$, $w_1$, . . ., $w_i$ each represent a weight, and $x_1$, $x_1$, . . ., $x_i$ represent signal features and/or the raw data. The signal features can include, but are not limited to, a center frequency, a change in frequency over time, a phase, a change in phase over time, amplitude, an average amplitude over time, a data rate, and a wavelength. The output $h_i$ includes a set of confidence scores. Each confidence score indicates a likelihood that a signal was modulated using a respective type of modulation. The set of confidence scores are stored in any format selected in accordance with a given application.

Figure 5:
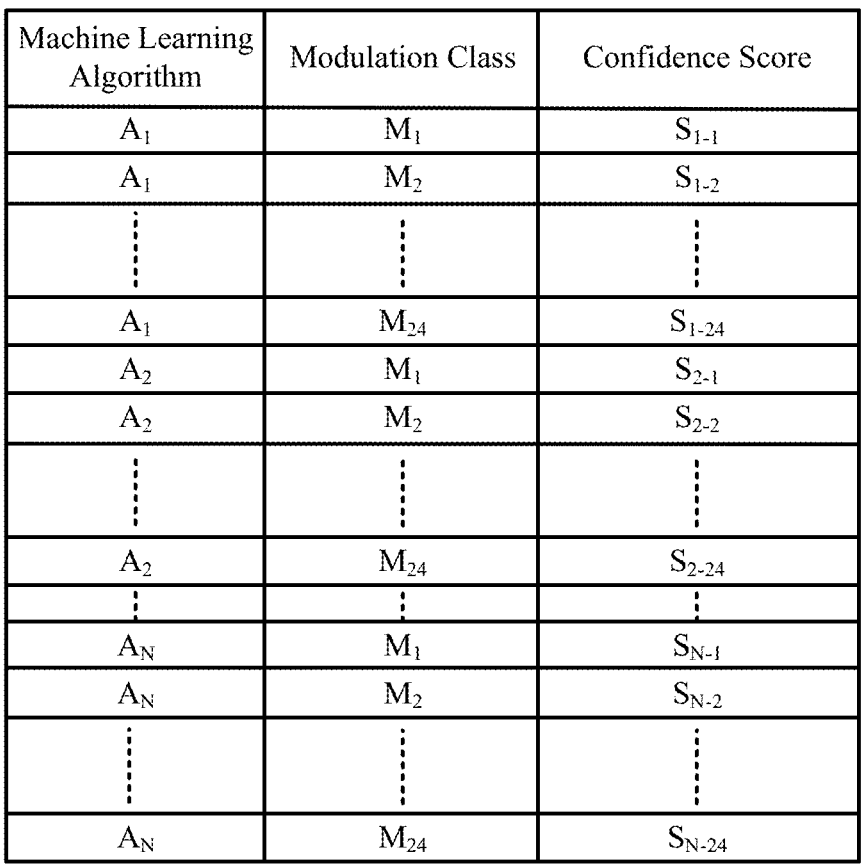
FIG. 5 provides a table showing illustrative machine learn related information.

For example, as shown in FIG. 5, the 24 confidence scores (e.g., $S_{1-1}$, $S_{1-2}$, . . ., $S_{1-24}$, $S_{2-1}$, $S_{2-2}$, . . ., $S_{2-24}$, . . ., $S_{N-1}$, $S_{N-2}$, . . ., $S_{N-24}$) are stored in a table format so as to be associated with identifiers for machine learning algorithms (e.g., A1 identifying a first neural network, A2 identifying a second neural network, . . ., A1 identifying an $N^{th}$ neural network) and identifiers for modulation classes (e.g., $M_1$ identifying a first modulation class, $M_2$ identifying a second modulation class, . . ., $M_{24}$ identifying a twenty-fourth modulation class). The modulation classes can include, but are not limited to, On-Off Keying (OOF), 4 Amplitude Shift Keying (ASK), Binary Phase Shift Keying (BPSK), Quadrature Phase Shift Keying (QPSK), 8 Phase Shift Keying (PSK), 16 Quadrature Amplitude Modulation (QAM), OQPSK, 16 PSK, 32 PSK, 16 Amplitude and Phase Shift Keying (APSK), 32 APSK, 64 APSK, 128 APSK, 16 QAM, 32 QAM, 64 QAM, 128 QAM, 256 QAM, Amplitude Modulation—Single Sideband—With Carrier (AM-SSB-WC), Amplitude Modulation—Single Sideband—Suppressed Carrier (AM-SSB-SC), Amplitude Modulation—Double Sideband—With Carrier (AM-DSB-WC), Amplitude Modulation—Double Sideband—Suppressed Carrier (AM-DSB-SC), Frequency Modulation (FM), and/or Gaussian Minimum Shift Keying (GMSK). Each confidence score can include, but is not limited to, a likelihood score and/or a goodness-of-fit-predicted score. The goodness-of-fit-predicted score may be calculated based on the number of signals (e.g., 2.5 million) and the number of modulation classes (e.g., 24). The goodness-of-fit-predicted score describes how well the machine learning algorithm and modulation class fit a set of signal observations. A measure of goodness-of-fit summarizes the discrepancy between observed values and the values expected under the machine learning algorithm in question. The goodness-of-fit-predicted score can be determined, for example, using a chi-squared distribution algorithm and/or a likelihood ratio algorithm. The present solution is not limited to the particulars of this example.

The cognitive sensor 402 then performs operations to either (i) select the modulation class associated with the highest confidence score or (ii) select one of the modulation classes for the signal based on results of an optimization algorithm. The optimization algorithm can include, but is not limited to, a game theory based optimization algorithm. The game theory based optimization algorithm will be discussed in detail below.

Once the modulation class has been decided for the received signal, the cognitive sensor 402 then makes a decision as to whether the source of the signal was a primary user of the wireless spectrum. This decision is made based on the modulation class, a bit rate and/or a center frequency of the signal. For example, a decision is made that the primary user is the source of a signal when the signal comprises a 10 MHZ-wide BPSK signal with a center frequency of 2.4 GHz. The present solution is not limited in this regard.

At least some of the hardware entities 414 perform actions involving access to and use of memory 412, which can be a Random Access Memory (RAM), and/or a disk driver. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412, with the cognitive sensor 420, and/or within the processor 406 during execution thereof by the communication device 400. The memory 412, cognitive sensor 420 and/or the processor 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the processor 406 and that cause the processor 406 to perform any one or more of the methodologies of the present disclosure.

Figure 6:
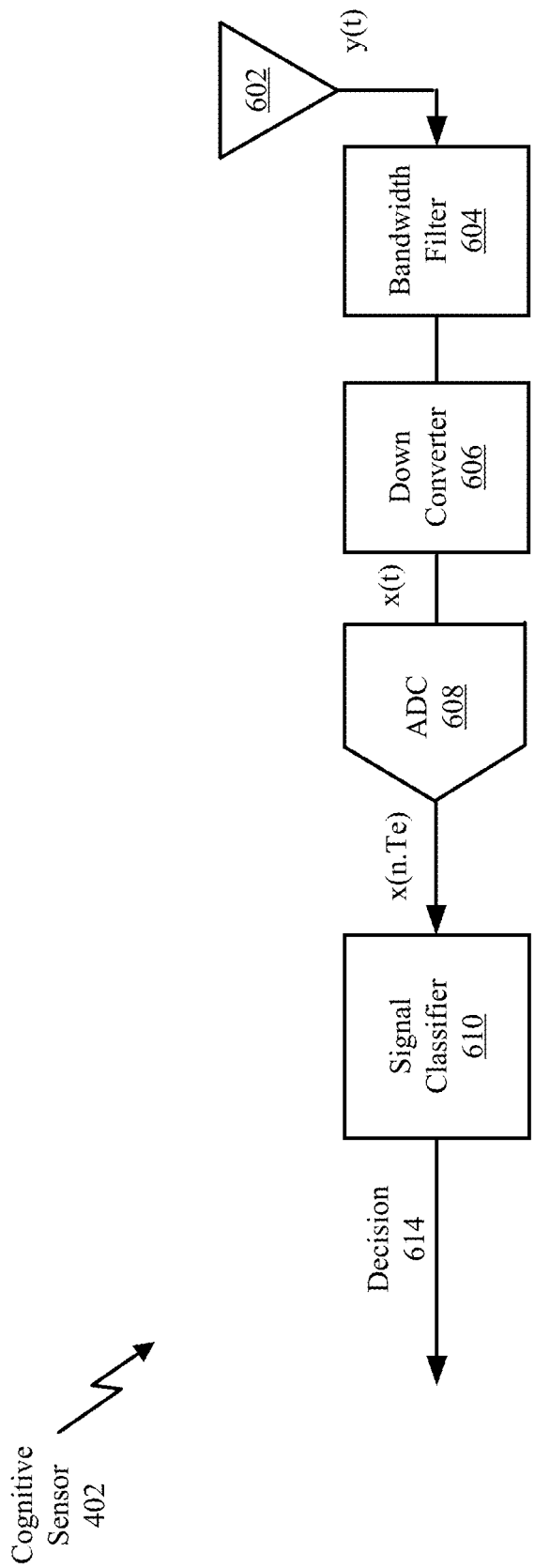
FIG. 6 provides a block diagram of an illustrative cognitive sensor.
Figure 7:
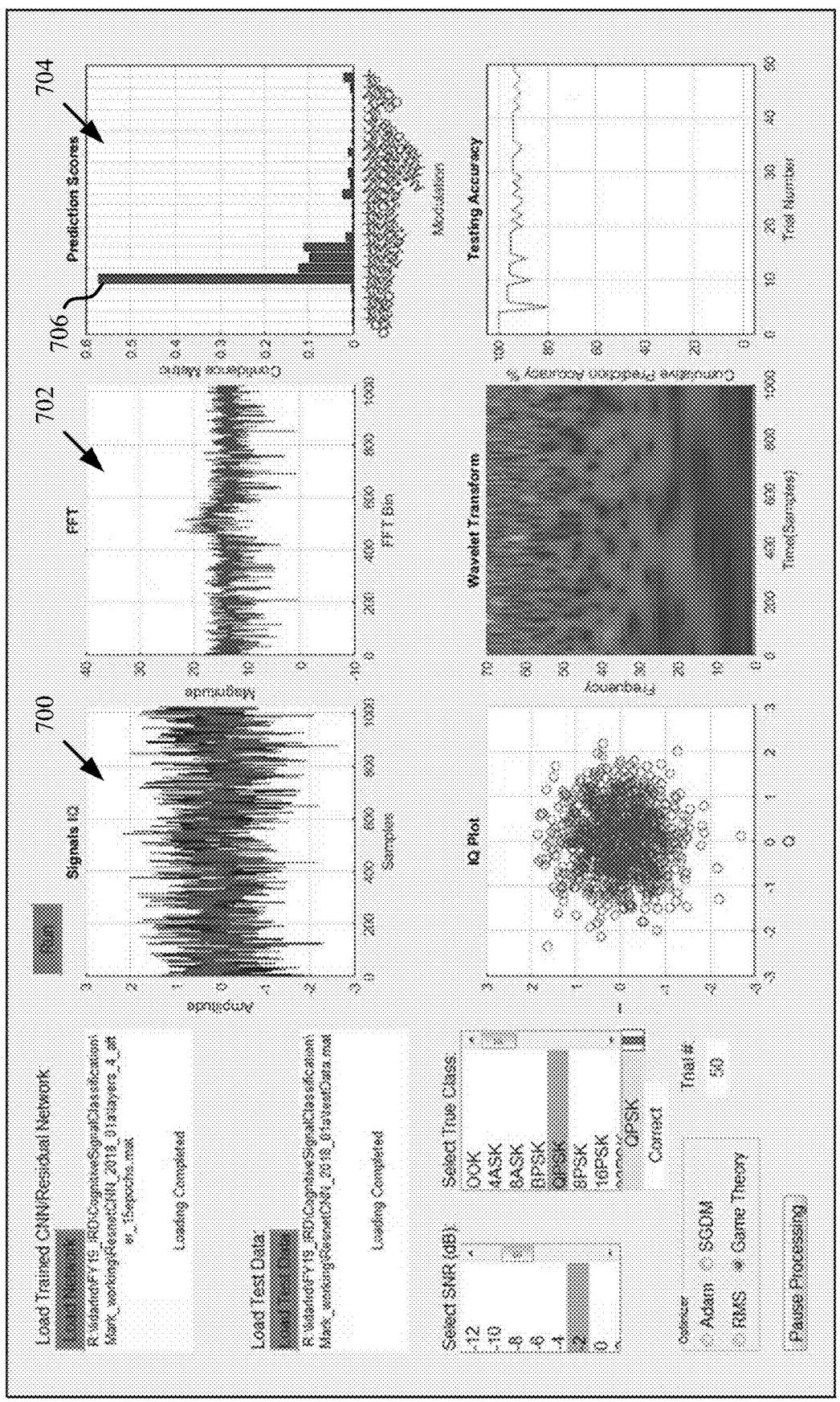
FIG. 7 provides graphs that are useful for understanding operations of the cognitive sensor shown in FIG. 6.

Referring now to FIG. 6, there is provided a more detailed diagram of the cognitive sensor 402. As shown in FIG. 6, cognitive sensor 402 is comprised of an antenna 602, a bandwidth filter 604, a down converter 606, an Analog-to-Digital Converter (ADC) 608, a machine learning algorithm selector 610, and a signal classifier 612. Antenna 602 is configured to receive a radio signal y(t) transmitted from communication devices (e.g., communication device 202, 204 and/or 206 of FIG. 1). An illustrative radio signal 700 is shown in FIG. 7. The received radio signal y(t) is filtered on a bandwidth $B_L$ by bandwidth filter 604, and then down converted by down converter 606. The down converted signal x(t) is passed to the input of the ADC 608. ADC 608 is configured to convert analog voltage values to digital values, and communicate the digital values x(n) to the signal classifier 610.

The signal classifier 612 uses one or more machine learning algorithms to (i) detect the radio signal y(t) in the presence of noise and (ii) make a decision 614 as to the modulation classification that should be assigned thereto. For example, as shown in FIG. 7, a trained CNN/neural network is provided a Fast Fourier Transform input signal 702, processes the input signal, and outputs prediction scores 704 for a plurality of modulation classes. The signal is assigned a QPSK modulation class since it is associated with the highest predictions score 706. The present solution is not limited to the particulars of this example. In other scenarios, one of the multiple specific learning algorithms used to train the neural network may be selected, or the ensemble of all of the techniques may be combined in an optimal way. The learning algorithms can include, but are not limited to, Adam, Stochastic Gradient Decent Method, and/or RMSprop; if all techniques available are employed, the outputs from the ensemble of networks trained by multiple techniques may be combined optimally by game theoretic techniques. It should be noted that the modulation class that is selected in accordance with the optimization algorithm may or may not be associated with the highest prediction/likelihood score.

Once the modulation classification has been decided for the signal, the signal classifier 612 performs further operations to determine whether the primary user is the source of the signal. These operations can involve: obtaining the modulation class assigned to the signal; obtaining a bit rate and center frequency for the radio signal; and comparing the modulation class, bit rate and center frequency to pre-stored source information to determine if a match exists therebetween by a certain amount (e.g., the bit rates match by at least 70% and/or the center frequencies match by at least 50%). If a match exists, then the signal classifier 612 decides that the primary user is the source of the radio signal and is using the band $B_L$. Otherwise, the signal classifier 612 decides that someone other than the primary user is the source of the radio signal and trying to encroach on the band $B_L$. If the radio signal y(t) is detected and the primary user is using the band $B_L$, then a decision is made that the band $B_L$ is unavailable. Otherwise, a decision is made that the band $B_L$ is available.

Figure 8:
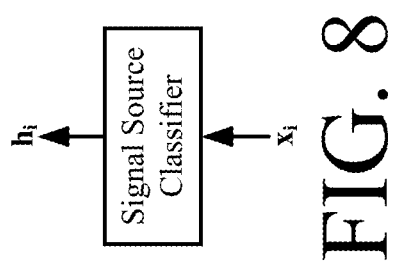

An illustrative architecture for a neural network implementing the present solution is provided in FIG. 8. As shown in FIG. 8, the neural network comprises a signal source classifier that performs one or more machine learning algorithms. Each machine learning algorithm uses an input $x_i$ and generates an output $h_i$. The input $x_i$ may be provided in a time domain (e.g., defines a waveform shape), a frequency domain, a phase domain and/or an amplitude domain. The output $h_i$ comprises a set of prediction/likelihood scores determined for a plurality of modulation classes. In some scenarios, the output $h_i$ is determined in accordance with the above provided mathematical equation (1) or (2).

Figure 9:
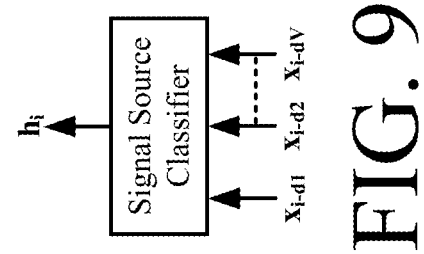

Another illustrative architecture for a neural network implementing the present solution is provided in FIG. 9. As shown in FIG. 9, the neural network comprises a signal source classifier that performs one or more machine learning algorithms. The signal source classifier receives a plurality of inputs $x_{i-d1}, x_{i-d2}, \ldots, x_{i-dV}$ and generates an output $h_i$. The inputs may be provided in different domains. For example, input $x_{i-d1}$ is provided in a frequency domain (e.g., defining a change in frequency over time). Input $x_{i-d2}$ is provided in a phase domain (e.g., defining a change in phase over time), while input $x_{i-dV}$ is provided in an amplitude domain (e.g., defining an average amplitude over time) or other domain (e.g., a time domain). The inputs $x_{i-d2}, \ldots, x_{i-dV}$ can be derived using various algorithms that include, but are not limited to, a Fourier transform algorithm, a power spectral density algorithm, a wavelet transform algorithm, and/or a spectrogram algorithm. Each machine learning algorithm uses a combination of the inputs to determine a set of prediction/likelihood scores. The inputs $x_{i-d1}, x_{i-d2}, \ldots, X_{i-dV}$ may be weighted differently by the machine learning algorithms. The weights can be pre-defined, or dynamically determined based on characteristic(s) of the received waveform. The prediction/likelihood scores are then analyzed to determine a modulation class to be assigned to the radio signal. For example, the modulation class is assigned to the radio signal which is associated with the highest prediction/likelihood score or which is associated with a prediction/likelihood score selected in accordance with an optimization algorithm (e.g., a game theory algorithm).

Figure 10:
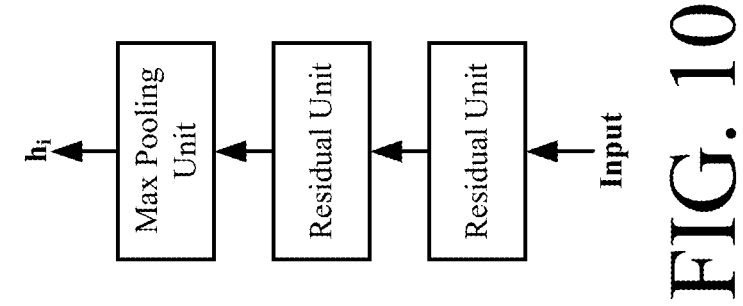
FIGS. 8-10 provide illustrations of illustrative machine learning algorithm architectures.

The present solution is not limited to the neural network architectures shown in FIGS. 8-9. For example, the neural network can include a plurality of residual units that perform the machine learning algorithm in a sequential manner as shown in FIG. 10.

As noted above, the modulation class may be selected based on results of a game theory analysis of the machine learned models. The following discussion explains an illustrative game theory optimization algorithm.

Typical optimization of a reward matrix in a one-sided, "game against nature" with a goal of determining the highest minimum gain is performed using linear programming techniques. In most cases, an optimal result is obtained, but occasionally one or more constraints eliminate possible feasible solutions. In this case, a more brute-force subset summing approach can be used. Subset summing computes the optimal solution by determining the highest gain decision after iteratively considering all subsets of the possible decision alternatives.

A game theory analysis can be understood by considering an exemplary tactical game. Values for the tactical game are presented in the following TABLE 1. The unitless values range from −5 to 5, which indicate the reward received performing a given action for a particular scenario. The actions for the player correlate in the rows in TABLE 1, while the potential scenarios correlate to the columns in TABLE 1. For example, the action of firing a mortar at an enemy truck yields a positive reward of 4, but firing a mortar on a civilian truck yields a negative reward of −4, i.e., a loss. The solution can be calculated from a linear program, with the results indicating that the best choice for the play is to advance rather than fire mortar or do nothing. In examples with very large reward matrices, the enhancement technique of subset summing may also be applied. Since there are four scenarios in this example (enemy truck, civilian truck, enemy tank, or friendly tank), there are $2^4=16$ subsets of the four scenarios. One of these subsets considers none of the scenarios, which is impractical. So in practice, there are always $2^P-1$ subsets, where P is the number of columns (available scenarios) in a reward matrix. TABLE 1 is reproduced from the following document: Jordan, J. D. (2007). Updating Optimal Decisions Using Game Theory and Exploring Risk Behavior Through Response Surface Methodology.

TABLE 1

|  | Enemy Truck | Civilian Truck | Enemy Tank | Friendly Tank |
| --- | --- | --- | --- | --- |
| Fire Mortar | 4 | −4 | 5 | −5 |
| Advance | 1 | 4 | 0 | 4 |
| Do Nothing | −1 | 1 | −2 | 1 |

The goal of linear programming is to maximize a function over a set constrained by linear inequalities and the following mathematical equations (3)-(9).

$$\max z = v + 0w_1 + 0w_2 + 0w_3 \quad (3)$$

$$s.t. \; v \leq 4w_1 + 1w_2 + -1w_3 \quad (4)$$

$$v \leq -4w_1 + 4w_2 + 1w_3 \quad (5)$$

$$v \leq 5w_1 + 0w_2 + -2w_3 \quad (6)$$

$$v \leq -5w_1 + 4w_2 + 1w_3 \quad (7)$$

$$\Sigma w_i = 1 \quad (8)$$

$$w_i \geq 0 \ \forall i \quad (9)$$

where z represents the value of the game or the objective function, v represents the value of the constraints, $w_1$ represents the optimal probability solution for the choice 'Fire Mortar', $w_2$ represents the optimal probability solution for the choice 'Advance', $w_3$ represents the optimal probability solution for the choice 'Do Nothing', and i represents the index of decision choice. Using a simplex algorithm to solve the linear program yields mixed strategy {0.2857, 0.7143, 0}. To maximize minimum gain, the player should fire a mortar approximately 29% of the time, advance 71% of the time, and do nothing none of the time.

In scenarios with very large reward matrices, the optional technique of subset summing may be applied. The subset summing algorithm reduces a constrained optimization problem to solving a series of simpler, reduced-dimension constrained optimization problems. Specifically, for a reward matrix consisting of P scenarios (columns), a set of $2^P-1$ new reward matrices are created by incorporating unique subsets of the scenarios. To illustrate the generation of the subsets to be considered, the following mathematical equation (10) shows an example of constraints from the example of TABLE 1 where each row in the equation corresponds to a row in the reward matrix A. Each new reduced reward matrix is formed by multiplying A element-wise by a binary matrix. Each of the $2^P-1$ binary matrices has a unique set of columns which are all-zero. The element-wise multiplication serves to mask out specific scenarios, leaving only specific combinations, or subsets, of the original scenarios to be considered. This operation increases the run time, but may be a necessary trade-off for improved accuracy. This method also ensures that the correct answer is found by computing the proper objective function. If, for example, A represents a reward matrix, then the solution for computing all combinations of rows is:

$$A .* \begin{bmatrix} 1 & 1 & 0 & 1 \\ 1 & 1 & 0 & 1 \\ 1 & 1 & 0 & 1 \end{bmatrix} \quad (10)$$

Figure 12:
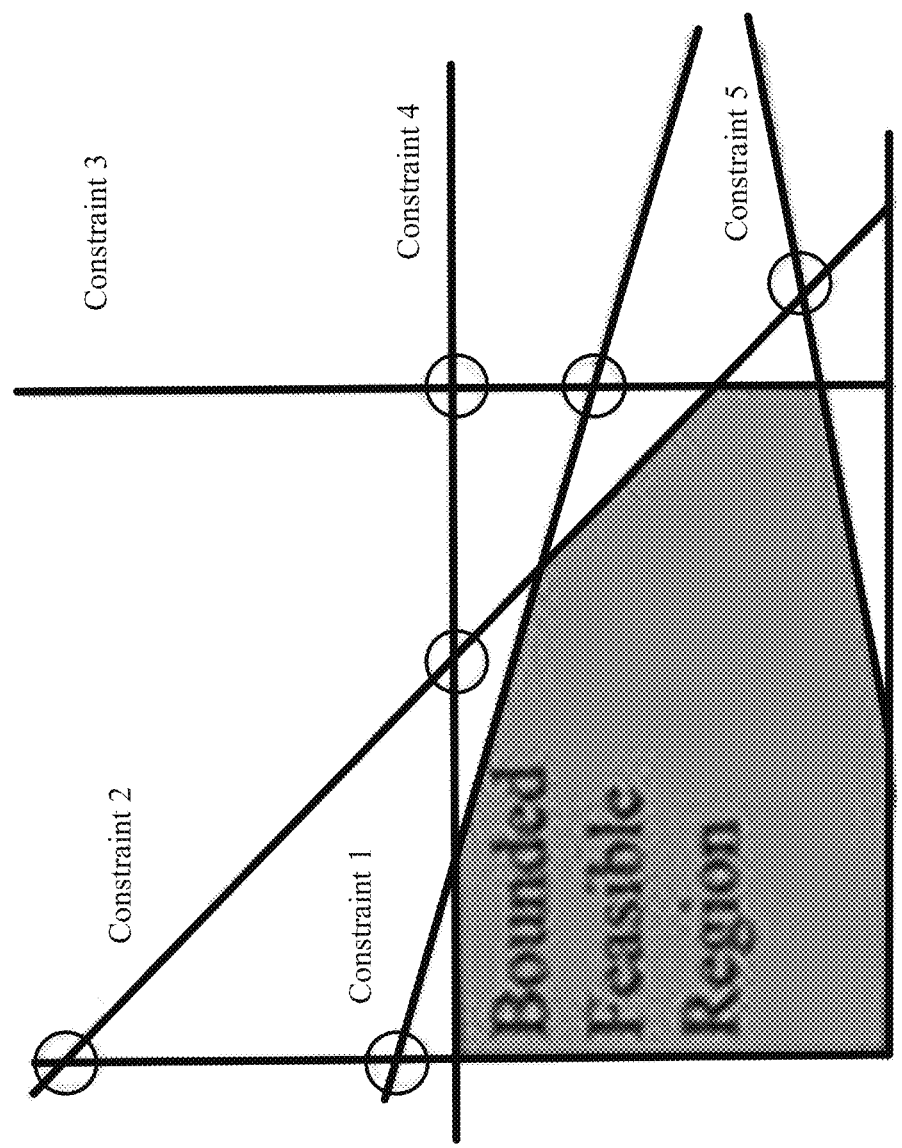
FIG. 12 provides a graph that is useful for understanding game theory.

One reason for running all combinations of decisions, $2^P-1$, where P is the number of columns in a reward matrix, is that one or more constraints eliminate(s) possible feasible solutions, as shown in FIG. 12 with circles. A feasible region is a graphical solution space for the set of all possible points of an optimization problem that satisfy the problem's constraints. Information is treated as parameters rather than constraints, so that a decision can be made outside of traditional feasible regions. This is why the present solution works robustly with complex data for general decision-making applications. Note that FIG. 12 is a simplified representation that could have as many as P dimensions.

Figure 11:
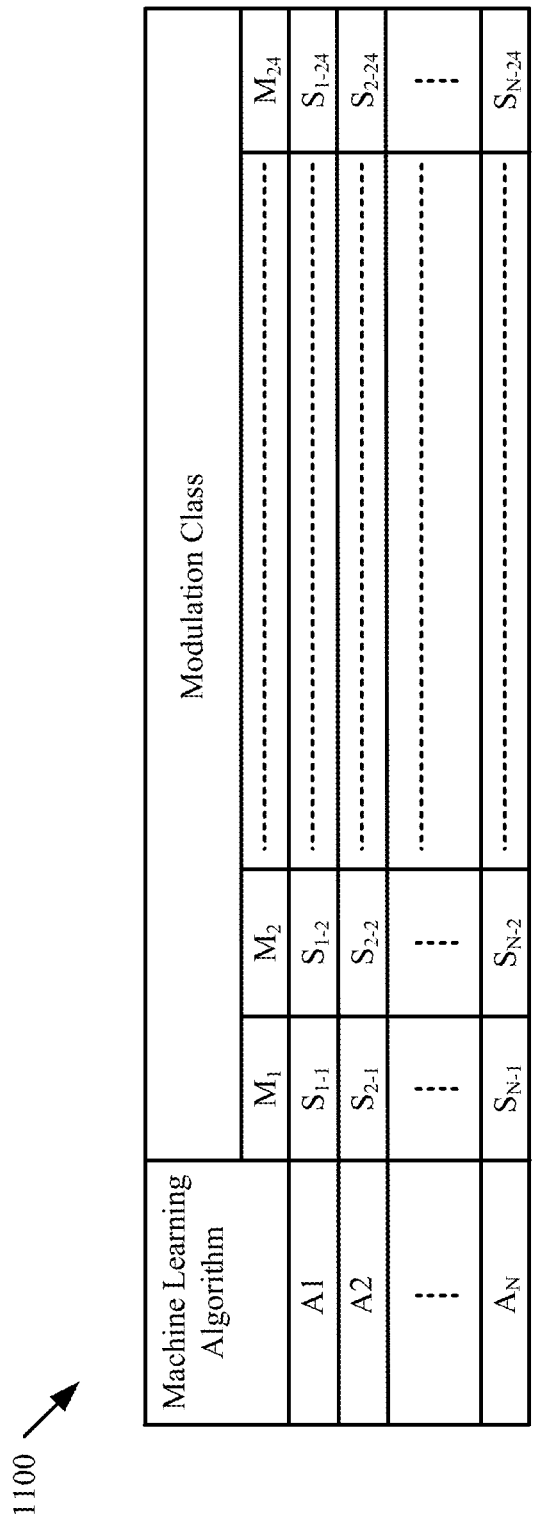
FIG. 11 provides a table that is useful for understanding game theory.

The above TABLE 1 can be modified in accordance with the present solution. For example, as shown in FIG. 11, each row of a table 1100 is associated with a respective machine learning algorithm of a plurality of machine learning algorithms, and each column is associated with a respective modulation class of a plurality of modulation classes. Each cell in the body of the table 1100 includes a likelihood score S. The likelihood scores can include, but are not limited to, goodness-of-fit-predicted scores calculated based on the number of signals and modulation classes. Each goodness-of-fit-predicted score describes how well the machine learned model and modulation class fit a set of observations. A measure of goodness-of-fit summarizes the discrepancy between observed values and the values expected under the machine learned model in question. The goodness-of-fit-predicted score can be determined, for example, using a chi-squared distribution algorithm and/or a likelihood ratio algorithm. The modulation classes can include, but are not limited to, frequency modulation, amplitude modulation, phase modulation, angle modulation, and/or line coding modulation.

The reward matrix illustrated by table 1100 can be constructed and solved using a linear program. For example, an interior-point algorithm can be employed. A primal standard form can be used to calculate optimal tasks and characteristics in accordance with the following mathematical equation (11).

$$\text{maximize } f(x) \text{ s.t.} \quad (11)$$

$$A(x) \leq b$$

$$x \geq 0$$

Figure 13:
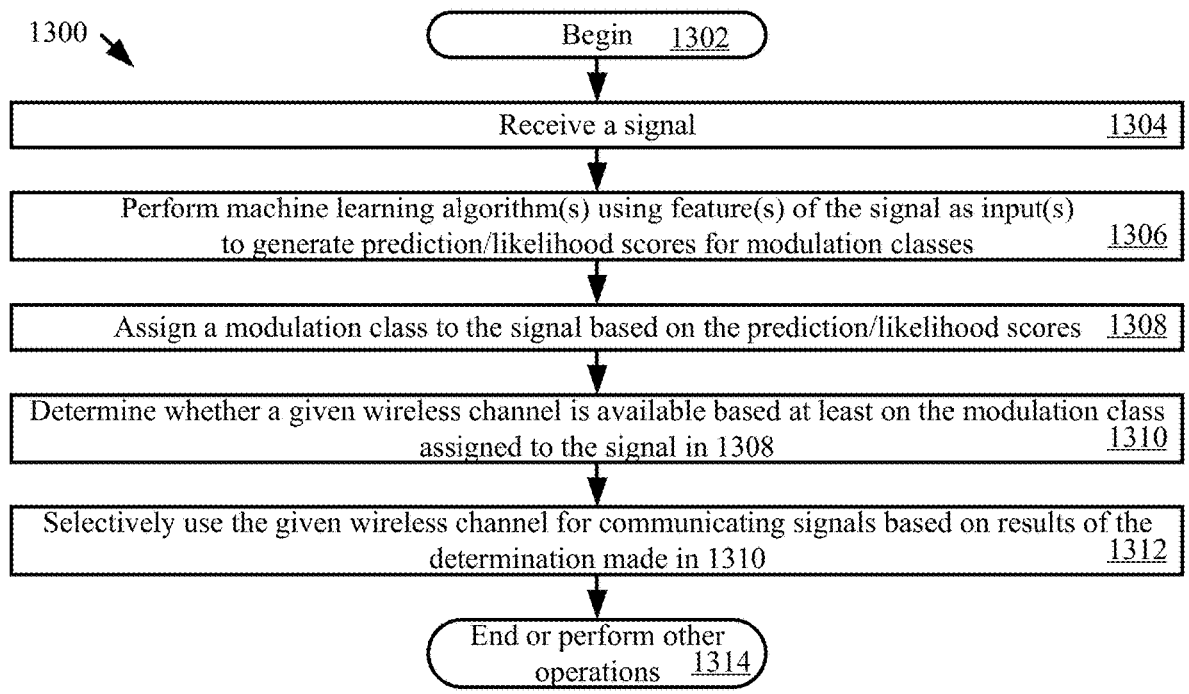
FIG. 13 provides a flow diagram of an illustrative method for determining an availability of channel(s) in a wireless spectrum.

Referring now to FIG. 13, there is provided a flow diagram of an illustrative method 1300 for operating a communication device (e.g., communication device 202, 204 or 206 of FIG. 2). Method 1300 begins with 1302 and continues with 1304 where the communication device receives a signal (e.g., signal 700 of FIG. 7). In 1306, the communication device performs one or more machine learning algorithms (e.g., neural network(s)) using at least one feature of the signal (e.g., a frequency, phase, amplitude) as an input to generate a plurality of scores (e.g., goodness-of-fit-predicted scores). Each score represents a likelihood that the signal was modulated using a given modulation type of a plurality of different modulation types (e.g., ASK, PSK, QAM, and/or FM). A modulation class is assigned to the signal in 1308 based on the scores. For example, the signal is assigned a modulation class that is associated with the score having the greatest value. Alternatively, the signal is assigned a modulation class that is associated with a score that was selected based on results of an optimization algorithm (e.g., a game theory analysis).

Next in 1310, a determination is made by the communications device as to whether a given wireless channel (e.g., wireless channel 206 or 210 of FIG. 2) is available based on the modulation class assigned to the signal, a bit rate, and/or a center frequency of the signal. In some scenarios, a determination is made that the given wireless channel is unavailable when a decision is made that the primary user is not the source of the signal (e.g., based on the modulation class, bit rate of the signal and/or center frequency of the signal). A determination is made that the given wireless channel is unavailable when a decision is made that the primary user is the source of the signal (e.g., based on the modulation class, bit rate of the signal and/or center frequency of the signal).

The communication device performs operations in 1312 to selectively use the given wireless channel for communicating signals based on results of the determination made in 1310. For example, the given wireless channel is used by a secondary user (e.g., user 222 of FIG. 2) for communications when a decision is made that the same is available (e.g., when the primary user (e.g., user 220 of FIG. 2) is not the source of the signal thereby indicating that the primary user is not using the same). In contrast, the secondary user stops using the given wireless channel for communications when a decision is made that the same is unavailable (e.g., when the primary user is the source of the signal thereby indicating that the primary user is using the same). Subsequently, 1314 is performed where method 1300 ends or other operations are performed (e.g., return to 1304).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a communication device, comprising:
   receiving a signal at the communication device;
   performing, by the communication device, one or more machine learning algorithms using at least one feature of the signal as an input to generate a plurality of scores, each said score representing a likelihood that the signal was modulated using a given modulation type of a plurality of different modulation types;
   selecting a score from the plurality of scores based on results of a game theory analysis;
   assigning a modulation class to the signal based on the plurality of scores, wherein the modulation class is associated with the selected score;
   determining whether a given wireless channel is available based at least on the modulation class assigned to the signal; and
   selectively using the given wireless channel for communicating signals based on results of said determining.

2. The method according to claim 1, wherein the communication device comprises a cognitive radio.

3. The method according to claim 1, further comprising selecting a score from the plurality of scores which has a highest value.

4. The method according to claim 3, wherein the modulation class is associated with the selected score.

5. The method according to claim 1, further comprising deciding whether a source of the signal is a primary user of the given wireless channel based at least on the modulation class assigned to the signal.

6. The method according to claim 5, wherein a determination is made that the given wireless channel is unavailable when a decision is made that the primary user is the source of the signal.

7. The method according to claim 5, wherein the deciding is further based on a bit rate and a center frequency of the signal.

8. The method according to claim 1, wherein each of the plurality of scores comprises a goodness-of-fit-predicted score.

9. A communication device, comprising:
   a processor; and
   a non-transitory computer-readable storage medium comprising programming instructions that are configured to cause the processor to implement a method for performing communication operations, wherein the programming instructions comprise instructions to:
   receive a signal;
   effectively store training data for one or more machine learning algorithms, using compressive sensing techniques;
   perform one or more machine learning algorithms using at least one feature of the signal as an input to generate a plurality of scores, each said score representing a likelihood that the signal was modulated using a given modulation type of a plurality of different modulation types;
   select a score from the plurality of scores based on results of a game theory analysis;
   assign a modulation class to the signal based on the plurality of scores, wherein the modulation class is associated with the selected score;
   determine whether a given wireless channel is available based at least on the modulation class assigned to the signal; and
   selectively use the given wireless channel for communicating signals based on results of said determining.

10. The communication device according to claim 9, wherein the communication device comprises a cognitive radio.

11. The communication device according to claim 9, wherein the programming instructions further comprise instructions to select a score from the plurality of scores which has a highest value.

12. The communication device according to claim 11, wherein the modulation class is associated with the selected score.

13. The communication device according to claim 9, wherein the programming instructions further comprise instructions to select decide whether a source of the signal is a primary user of the given wireless channel based at least on the modulation class assigned to the signal.

14. The communication device according to claim 13, wherein a determination is made that the given wireless channel is unavailable when a decision is made that the primary user is the source of the signal.

15. The communication device according to claim 13, wherein the decision as to whether the source of the signal is the primary user is further based on a bit rate and a center frequency of the signal.

16. The communication device according to claim 9, wherein each of the plurality of scores comprises a goodness-of-fit-predicted score.

17. The communication device according to claim 9, wherein compressive sensing techniques are employed to reduce memory storage requirements for the training data used by one or more machine learning algorithms.

* * * * *